US009381610B2

(12) United States Patent
Gordon

(10) Patent No.: US 9,381,610 B2
(45) Date of Patent: Jul. 5, 2016

(54) LATHE CUTTER HEIGHT GAUGE AND METHOD OF USE

(71) Applicant: Sean Edward Gordon, Tucson, AZ (US)

(72) Inventor: Sean Edward Gordon, Tucson, AZ (US)

( * ) Notice: Subject to any disclaimer, the term of this patent is extended or adjusted under 35 U.S.C. 154(b) by 66 days.

(21) Appl. No.: 14/266,181

(22) Filed: Apr. 30, 2014

(65) Prior Publication Data

US 2015/0314412 A1 Nov. 5, 2015

(51) Int. Cl.
*G01C 9/28* (2006.01)
*B23Q 17/22* (2006.01)
*G01C 9/34* (2006.01)

(52) U.S. Cl.
CPC .............. *B23Q 17/2266* (2013.01); *G01C 9/34* (2013.01)

(58) Field of Classification Search
CPC ................................... B23Q 17/26; G01C 9/36
USPC ........... 33/347, 370, 371, 372, 373, 628, 630, 33/642
See application file for complete search history.

(56) References Cited

U.S. PATENT DOCUMENTS

| 4,546,548 | A | * | 10/1985 | Bullock, Sr. | G01B 5/24 33/203 |
| 4,908,949 | A | * | 3/1990 | Jaccard | G01C 9/28 33/334 |
| 5,111,590 | A | * | 5/1992 | Park | G01B 21/042 33/502 |
| 5,207,004 | A | * | 5/1993 | Gruetzmacher | G01C 9/28 33/373 |
| 5,253,425 | A | * | 10/1993 | Wozniak | G01C 9/28 33/373 |
| 5,421,094 | A | * | 6/1995 | McCord | G01C 9/28 33/371 |
| 6,029,359 | A | * | 2/2000 | Szumer | G01C 9/28 33/373 |
| 6,389,709 | B1 | * | 5/2002 | Lunde | G01C 5/00 33/292 |
| 6,432,676 | B1 | * | 8/2002 | Tubert | A01K 67/0275 435/320.1 |
| 6,832,440 | B2 | * | 12/2004 | Navarro, Sr. | G01B 5/245 33/626 |
| 7,676,940 | B2 | * | 3/2010 | Spaulding | G01C 9/28 33/373 |
| 2003/0066198 | A1 | * | 4/2003 | Turner | G01C 9/28 33/370 |
| 2008/0222907 | A1 | * | 9/2008 | Silberberg | G01C 9/34 33/379 |
| 2011/0162222 | A1 | * | 7/2011 | Ben-Josef | G01C 9/34 33/379 |
| 2012/0151785 | A1 | * | 6/2012 | Lettkeman | G01C 9/28 33/301 |
| 2015/0160008 | A1 | * | 6/2015 | Silberberg | G01C 9/28 33/381 |

* cited by examiner

*Primary Examiner* — G. Bradley Bennett
(74) *Attorney, Agent, or Firm* — Lyman Moulton, Esq.

(57) ABSTRACT

A gauge sets a height of a lathe cutter to a spindle axis. The gauge comprises an adjustable housing and a level vial, a longitudinal positioning of the level vial to be perpendicular to the spindle axis. A bubble in the level vial is longitudinally centered therein and the adjustable housing is fixed in place relative to the gauge. A chamfered notch in the gauge is slidable along a length of a shaft positioned in the spindle thereof. Flexible prongs secure the level vial relative to the adjustable housing. One of a set screw, a clamp and rubber bands secure the level vial relative to the adjustable housing. A receptacle in the gauge receives a shaft positioned in the spindle and enables laterally adjusting the gauge on a length of the shaft until the contact face of the gauge is laterally aligned with the tip of the lathe cutter.

22 Claims, 15 Drawing Sheets

LATHE CUTTER HEIGHT GAUGE AND METHOD OF USE

BACKGROUND AND FIELD OF INVENTION

Before a milling machine operation is performed, a lathe cutter must be properly positioned relative to a work piece held in the lathe spindle axis. If the lathe cutter and the work piece are not properly positioned then the milling machine operation results are unpredictable. However, the 'teeth' of a lathe spindle when completely closed still leave a space between 'teeth' so a user can't very easily adjust a lathe cutter to the exact center of the spindle.

A common way of getting around this problem is to produce a nub in a sacrificial work piece and then center the lathe cutter to a center of the nub but that is a time consuming and iterative process and sacrifices work material. Also, manually determining an exact center of the work piece nub can be problematic and error prone. Furthermore, this calibration-like procedure must be redone every time the lathe bed is otherwise adjusted for slant lathe bed operations.

There is a long felt need in the milling machine market for a simple and reliable lathe cutter height gauge which allows repetitious and consistent placement of a lathe cutter to a work piece along the longitudinal axis in relation a cutting tool. Machinists have long needed such a gauge which allows the work piece to be accurately and safely machined on all surfaces exposed to the cutting tool.

SUMMARY OF THE INVENTION

A lathe cutter height gauge as disclosed is configured to set a height of a lathe cutter to a same height of a spindle axis. The gauge comprises an adjustable housing moveably connected to the gauge. The adjustable housing comprises a level vial. A longitudinal positioning of the level vial is configured to be perpendicular to the spindle axis. The adjustable housing is moveably connected to the gauge to enable a bubble in the level vial to be longitudinally centered therein and the adjustable housing to be fixed in place relative to the gauge. A chamfered notch in the gauge is configured to circumferentially mate with and to be slidable along a length of a shaft positioned in a collet or a chuck of the spindle thereof and also to be rotatable about an axis thereof.

The adjustable housing further comprises flexible prongs extending therefrom. The prongs are configured to secure the level vial in a determinable position relative to the adjustable housing by at least one of a mechanical fit and a frictional fit. The flexible prongs are also configured to enable interchanging the level vial with any other level vial of similar dimensions by a digital action excluding moving the adjustable housing and loosening an adjustment screw thereof and precluding any glue, adhesive, set screws and any third component thereof. The adjustable housing further comprises a set screw configured to extend from an outside of the adjustable housing through the housing onto the level vial, the set screw configured to secure the level vial in a determinable position relative to the adjustable housing by a mechanical fit. The adjustable housing further comprises a clamp, the clamp configured to secure the level vial in a determinable position relative to the adjustable housing by at least one of a mechanical fit and a frictional fit. The adjustable housing further comprises a plurality of rubber bands configured to secure the level vial in a determinable position relative to the adjustable housing by a frictional fit. The level vial and the adjustable housing are configured relative to each other to enable positioning the adjustable housing and the bubble in the level vial thereof to cancel an offset of a lathe that has not been leveled.

The gauge also includes a receptacle defined through the gauge body for orthogonally receiving a shaft positioned in one of a collet and a chuck of the spindle. The gauge receptacle receives the shaft perpendicular to the level vial and a center of the shaft in the receptacle is 180 degrees opposite a contact face of the gauge. The receptacle is configured to be slidable along a length of the shaft and also to be rotatable about an axis thereof. An inner diameter of the gauge receptacle measures a nominal one quarter inch in diameter. The gauge receptacle is configured to enable laterally adjusting the gauge on a length of the shaft protruding from the spindle until the contact face of the gauge is laterally aligned with the tip of the lathe cutter.

Other aspects and advantages of embodiments of the disclosure will become apparent from the following detailed description, taken in conjunction with the accompanying drawings, illustrated by way of example of the principles of the disclosure.

Figure 1:
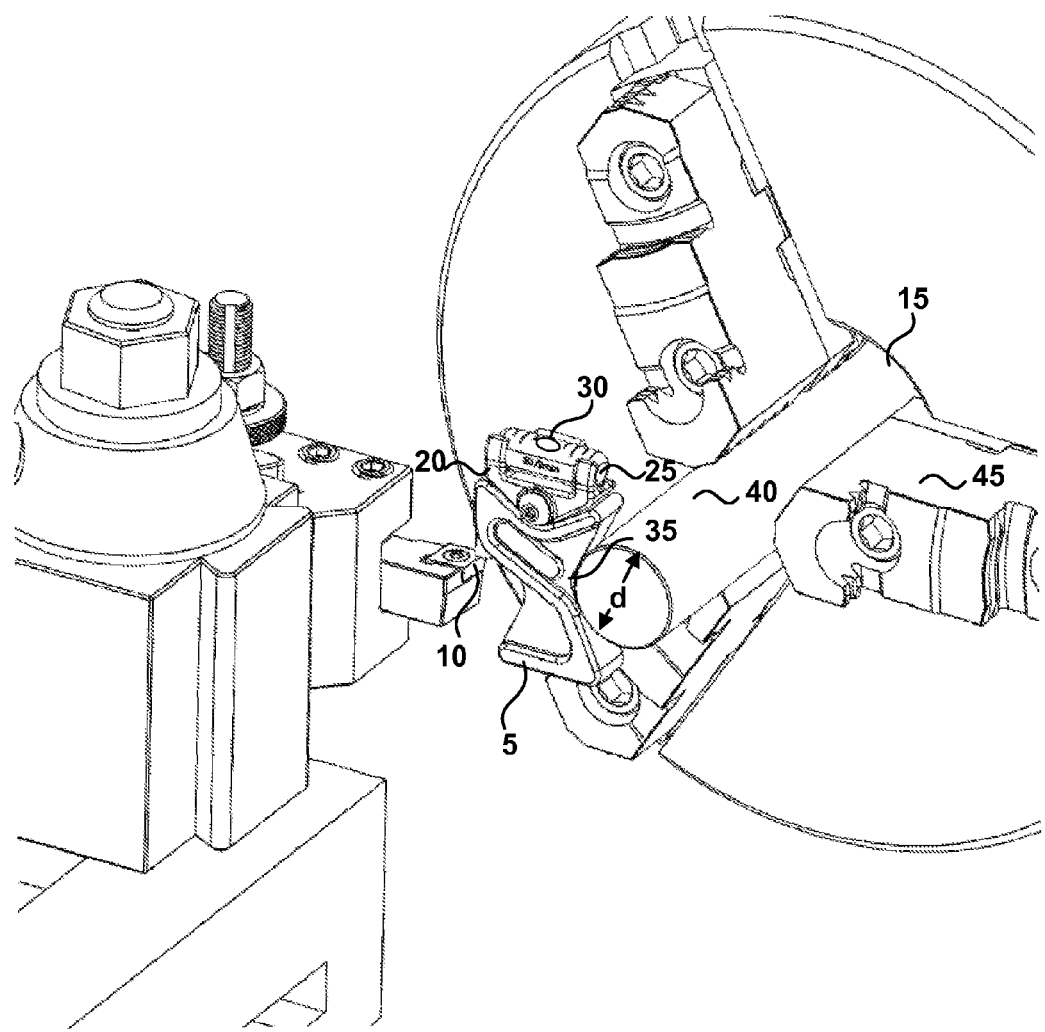
FIG. 1 is a perspective view of a lathe cutter height gauge configured to set a lathe cutter on a plane parallel to a lathe bed intersecting a spindle axis in accordance with an embodiment of the present disclosure.

Throughout the description, similar and same reference numbers may be used to identify similar and same elements depicted in multiple embodiments. Although specific embodiments of the invention have been described and illustrated, the invention is not to be limited to the specific forms or arrangements of parts so described and illustrated. The scope of the invention is to be defined by the claims appended hereto and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to one skilled in the relevant art and having possession of this disclosure, are to be considered within the scope of the invention.

The term 'longitudinally' as used throughout the present disclosure defines a lengthwise dimension or a longer distinguishing dimension. Also, all dimensions specified herein include a plus or minus ten percent tolerance for manufacturing and vendor interchangeability.

FIG. 1 is a perspective view of a lathe cutter height gauge configured to set a lathe cutter on a plane parallel to a lathe bed intersecting a spindle axis in accordance with an embodiment of the present disclosure. The disclosed gauge 5 is configured to set a lathe cutter 10 on a plane parallel to a lathe bed intersecting a spindle axis 15. The gauge 5 comprises a base 1 and an adjustable housing 20 configured to secure a level vial 25 therein. A longitudinal positioning of the level vial 25 is configured to be perpendicular to the spindle axis 15, the adjustable housing 20 moveably connected to the gauge to enable a bubble 30 in the level vial 25 to be longitudinally centered therein and the adjustable housing 20 to be fixed in place relative to the gauge 5. A chamfered notch 35 in the gauge 5 is configured to circumferentially mate with and to be slidable along a length of a shaft 40 positioned in one of a collet 45 or a chuck of the spindle 15 thereof and also to be rotatable about an axis thereof. The chamfered notch 35 of the gauge 5 is configured to accommodate any round stock shaft up to 4 inches in diameter 'd.'

Figure 2:
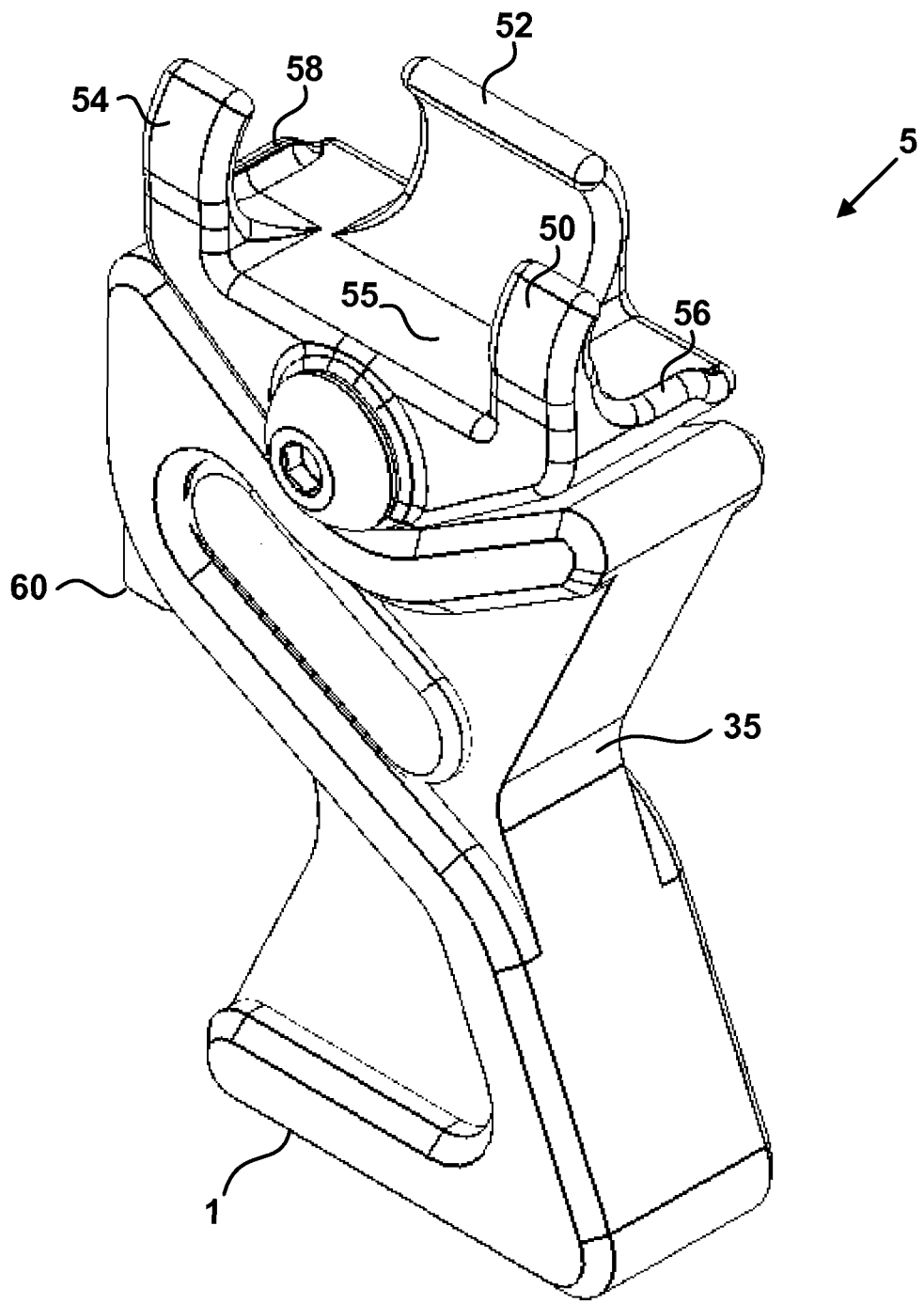
FIG. 2 is a perspective view of the disclosed lathe cutter height gauge with a chamfered notch, flexible prongs and a pronged cradle in accordance with an embodiment of the present disclosure.

FIG. 2 is a perspective view of the disclosed lathe cutter height gauge with a chamfered notch, flexible prongs and a pronged cradle in accordance with an embodiment of the present disclosure. The adjustable housing 20 further comprises a plurality of flexible prongs 50, 52 and 54 extending therefrom, the prongs configured to secure the level vial (not depicted) in a determinable position relative to the adjustable housing 20 by at least one of a mechanical fit and a frictional fit. The flexible prongs 50, 52 and 54 are configured to enable interchanging the level vial with any other level vial of similar dimensions by a digital action excluding moving the adjustable housing and loosening an adjustment screw thereof and precluding any glue, adhesive, set screws and any third component thereof. A contact face 60 of the gauge is configured to make contact with the lathe cutter 10 for setting a height of the cutter as explained in detail below regarding the methods of operating the gauge. A prong cradle 55 is created at the base of the flexible prongs 50, 52 and 54. Two lips 56 and 58 on either longitudinal sides of the prong cradle 55 help to secure the level vial (not depicted) within the prong cradle 55 and the flexible prongs 50, 52 and 54. The flexible prongs may be forced apart for easy insertion of the level vial and are therefore comprised of flexible plastic and other flexible materials with memory.

Figure 3:
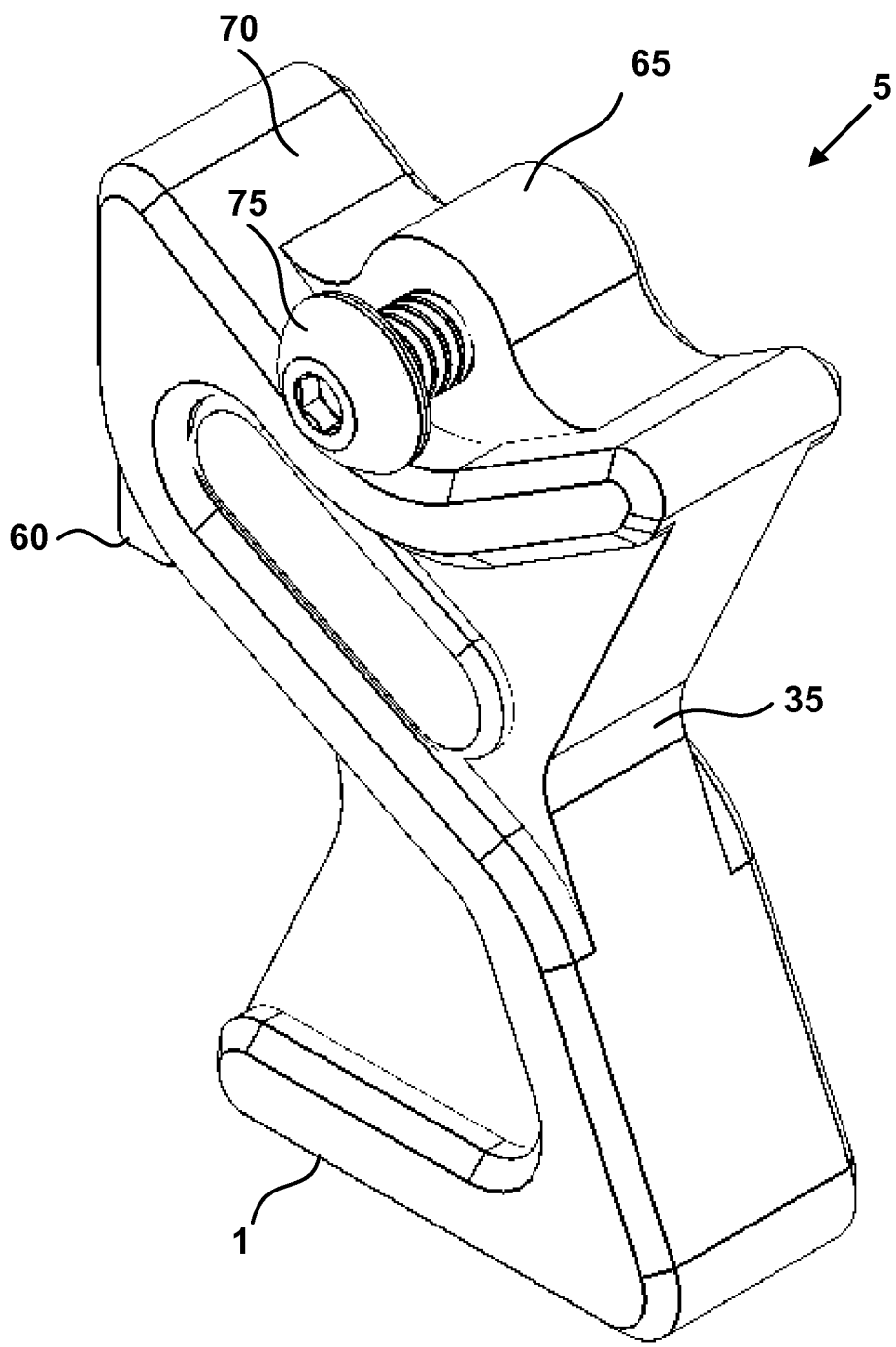
FIG. 3 is a perspective view of the lathe cutter height gauge with a chamfered notch sans flexible prongs and pronged cradle in accordance with an embodiment of the present disclosure.

FIG. 3 is a perspective view of the lathe cutter height gauge with a chamfered notch sans flexible prongs and pronged cradle in accordance with an embodiment of the present disclosure. The depiction more clearly illustrates the housing boss 65 and the housing cradle 70 and the boss screw 75. The adjustable housing 20 pivots on the housing boss 65 for adjustment of the bubble within the level vial (not depicted) to calibrate the gauge. The boss screw 75 is using to fix the calibrated position of the adjustable housing relative to the gauge body. The housing cradle 70 limits the movement of the adjustable housing about the housing boss 65 and boss screw 75.

Figure 4:
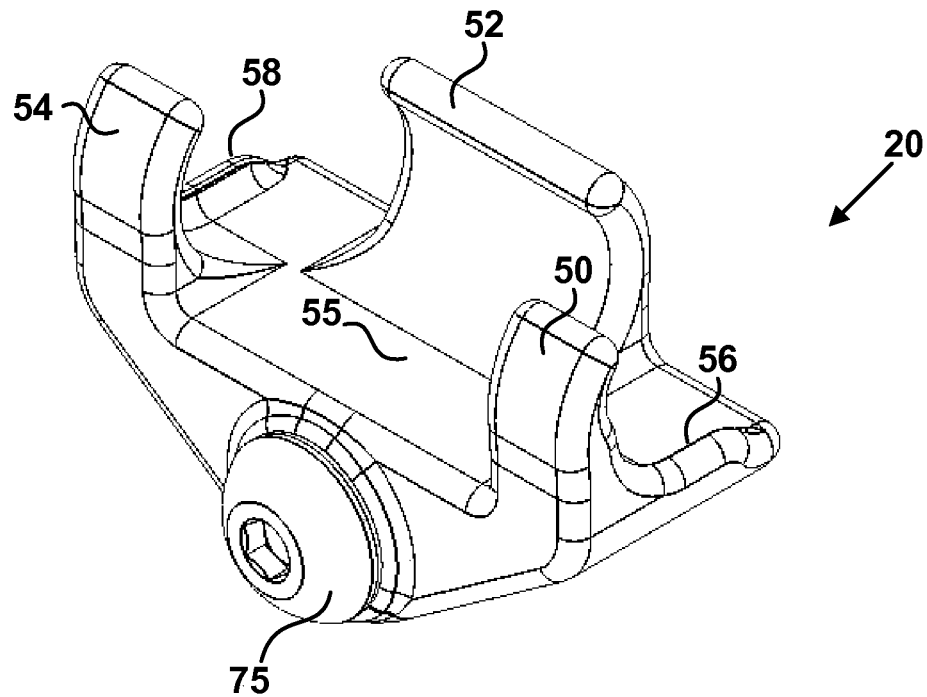
FIG. 4 is a perspective view of the adjustable housing with flexible prongs and a pronged cradle and a housing boss screw in accordance with an embodiment of the present disclosure.

FIG. 4 is a perspective view of the adjustable housing with flexible prongs and a pronged cradle and a housing boss screw sans the gauge body in accordance with an embodiment of the present disclosure. The reference numbers are the same or similar for same or similar structural features illustrated in FIG. 2 but are shown separately for purposes of clarification of the adjustable housing 20.

Figure 5:
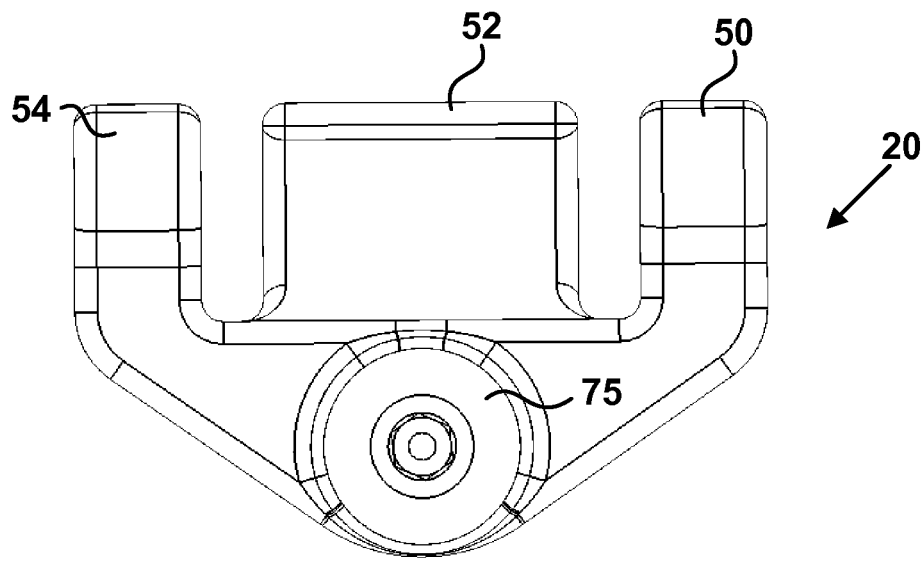
FIG. 5 is a front elevational view of the adjustable housing with flexible prongs and a pronged cradle and a housing boss screw in accordance with an embodiment of the present disclosure.

FIG. 5 is a front elevational view of the adjustable housing with flexible prongs and a pronged cradle and a housing boss screw sans the gauge body in accordance with an embodiment of the present disclosure. The reference numbers are the same or similar for same or similar structural features illustrated in FIG. 2 but are shown separately for purposes of clarification of the adjustable housing 20.

Figure 6:
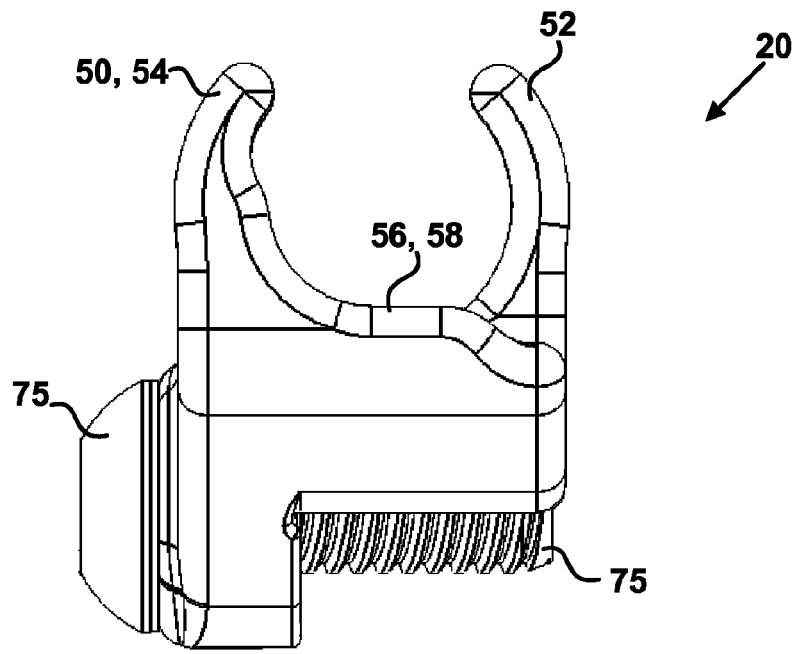
FIG. 6 is a side elevational view of the adjustable housing with flexible prongs and a pronged cradle and a housing boss screw in accordance with an embodiment of the present disclosure.

FIG. 6 is a side elevational view of the adjustable housing with flexible prongs and a pronged cradle and a housing boss screw sans the gauge body in accordance with an embodiment of the present disclosure. The reference numbers are the same or similar for same or similar structural features illustrated in FIG. 2 but are shown separately for purposes of clarification of the adjustable housing 20.

Figure 7:
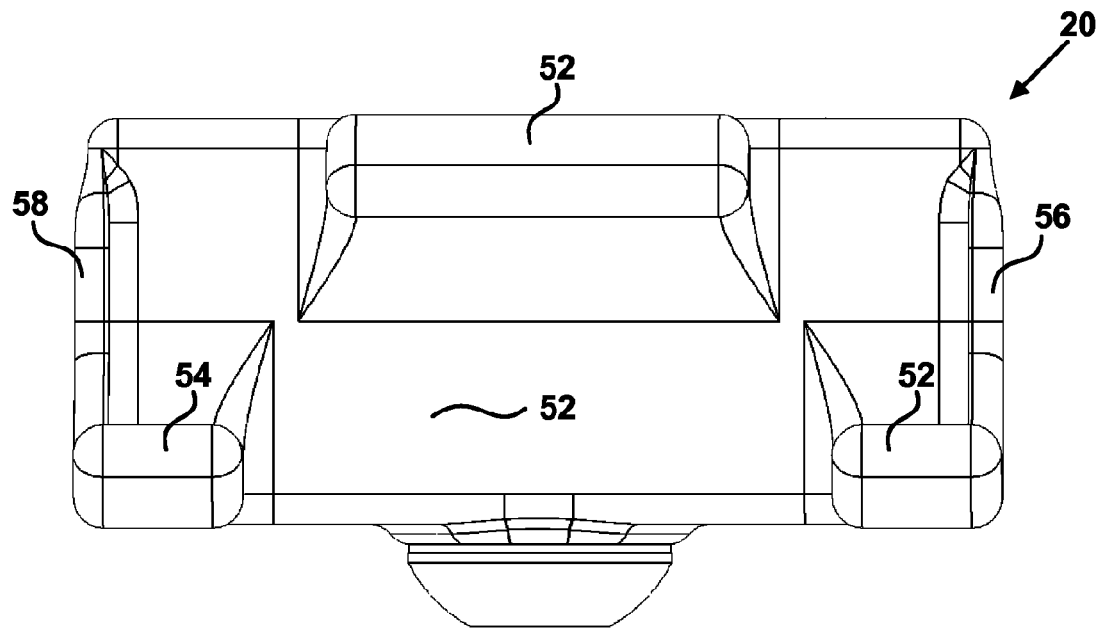
FIG. 7 is a top elevational view of the adjustable housing with flexible prongs and a pronged cradle and a housing boss screw in accordance with an embodiment of the present disclosure.

FIG. 7 is a top elevational view of the adjustable housing with flexible prongs and a pronged cradle and a housing boss screw sans the gauge body in accordance with an embodiment of the present disclosure. The reference numbers are the same or similar for same or similar structural features illustrated in FIG. 2 but are shown separately for purposes of clarification of the adjustable housing 20.

The level vial and the adjustable housing are configured relative to each other to enable positioning the adjustable housing and the bubble in the level vial thereof to cancel an offset of a lathe that has not been leveled. Embodiments of the disclosure may further comprise marking indicia on the adjustable housing relative to the gauge base, the indicia configured to add a calibration offset to a known angle set between the gauge base and the adjustable housing for a slant bed lathe application.

Figure 8:
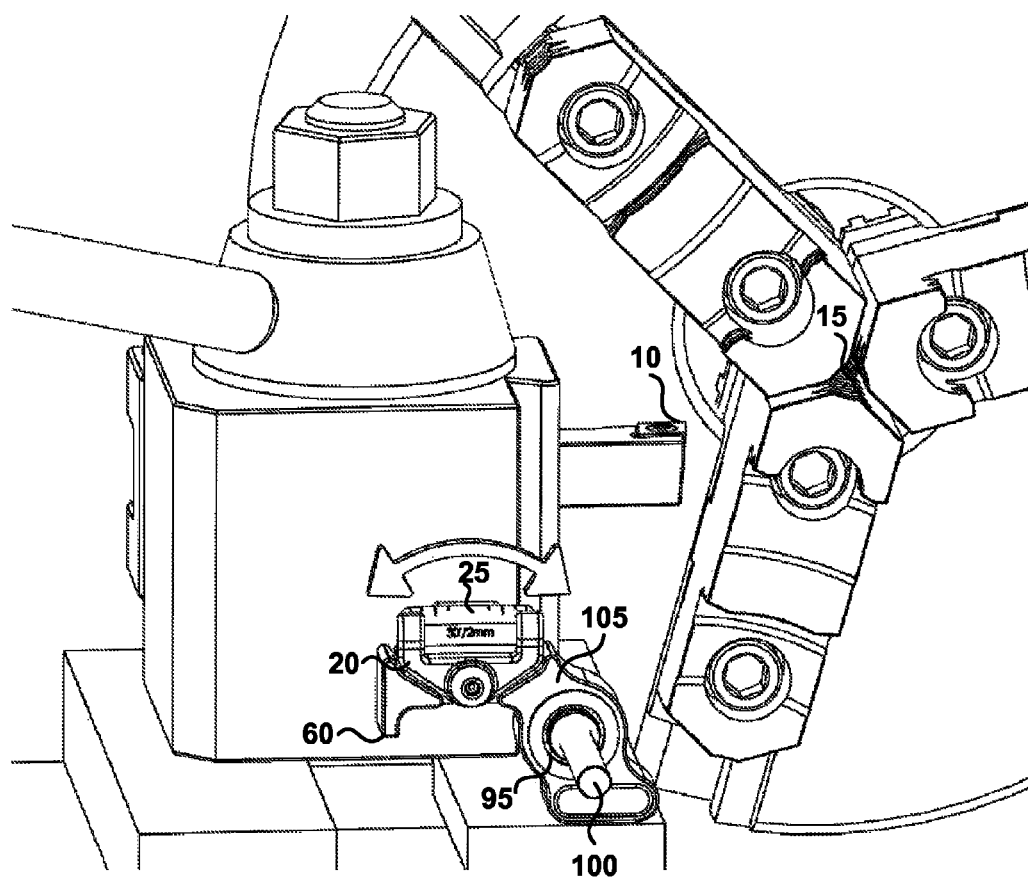
FIG. 8 is a perspective view of a lathe cutter height gauge with a rod receptacle configured to set a lathe cutter on a plane parallel to a lathe bed intersecting a spindle axis in accordance with an embodiment of the present disclosure.

FIG. 8 is a perspective view of a lathe cutter height gauge with a rod receptacle configured to set a lathe cutter on a plane parallel to a lathe bed intersecting a spindle axis in accordance with an embodiment of the present disclosure. The lather cutter height gauge 105 is configured to set a height of a lathe cutter 10 to a same height of a spindle axis 15. The gauge 105 comprises an adjustable housing 20 moveably connected to the gauge 105, the adjustable housing 20 comprising a level vial 25. A longitudinal positioning of the level vial 25 perpendicular to the spindle axis 15 allows the adjustable housing 20 to be fixed in place relative to the gauge 105. A receptacle 95 defined through the gauge body or base 1 orthogonally receives a shaft 100 positioned in a collet or a chuck 45 of the spindle. The receptacle 95 receives the shaft 100 perpendicular to the level vial 25 and a center of the shaft 100 in the receptacle 95 to be 180 degrees opposite a contact face 60 of the gauge 105. The receptacle 95 is configured to be slidable along a length of the shaft 100 and also to be rotatable about an axis thereof. An inner diameter of the gauge 105 receptacle 95 measures a nominal one quarter inch in diameter. The gauge receptacle 95 is configured to enable lateral adjustment of the gauge 105 on a length of the shaft 100 protruding from the spindle 15 until the contact face 60 of the gauge is laterally aligned with the tip of the lathe cutter.

Figure 9:
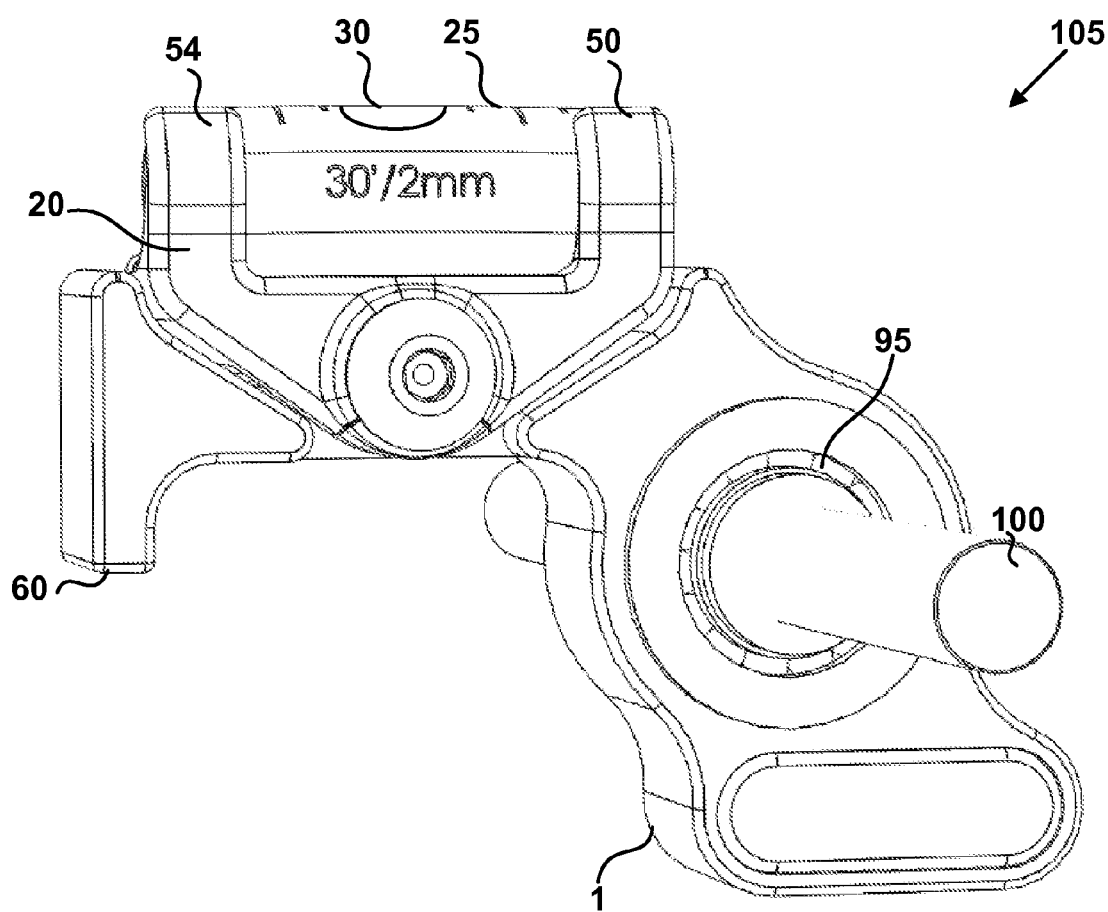
FIG. 9 is a perspective view of a lathe cutter height gauge with a rod receptacle, flexible prongs and pronged cradle in accordance with an embodiment of the present disclosure.

FIG. 9 is a perspective view of a lathe cutter height gauge with a rod receptacle, flexible prongs and pronged cradle in accordance with an embodiment of the present disclosure. The lathe cutter height gauge 105 includes a base 1, an adjustable housing 20 for a level vial 25 and a level bubble 30, flexible prongs 50, 52 and 54 (52 not visibly depicted), a rod receptacle 95 and a rod 100. The reference numbers for structural features depicted may be the same or similar to those depicted in FIG. 8 and FIG. 10. FIG. 9 illustrates the respective gauge 105 separate from the lathe and or a milling machine for disclosure clarity. The lathe cutter height gauge 105 may include an integrated rod 100 or it may be separate of the rod 100 depending on manufacturing and marketing considerations.

Figure 10:
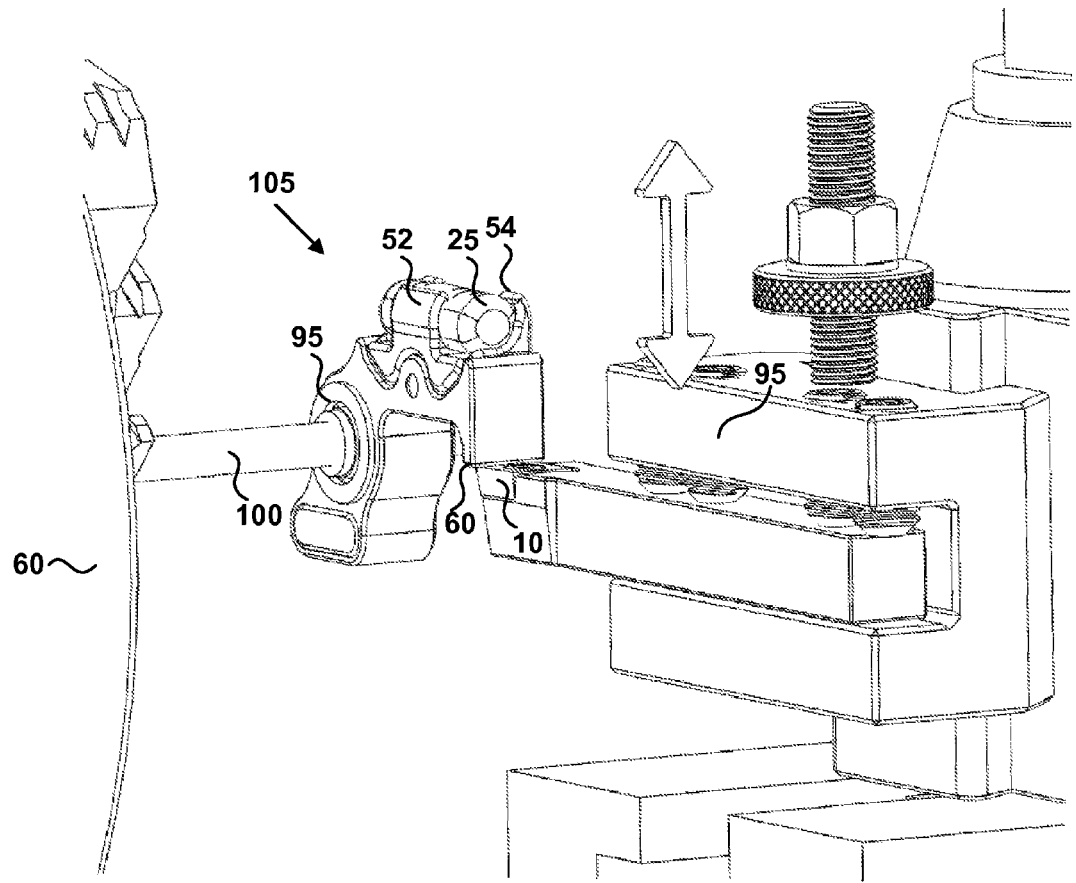
FIG. 10 is a perspective view of the lathe cutter height gauge with a rod received therein and disposed in a spindle and adjusted to a lathe cutter in accordance with an embodiment of the present disclosure.

FIG. 10 is a perspective view of the lathe cutter height gauge with a rod received therein and disposed in a spindle and adjusted to a lathe cutter in accordance with an embodiment of the present disclosure. The base 1 of the gauge 105 is positioned on a flat surface of the lathe. A longitudinal positioning of the adjustable housing 20 is made and fixed by the boss screw 75 (not depicted) so the gauge 105 is perpendicular to the spindle axis. An end of the rod 100 is then fixed in the chuck 45 of the spindle and the gauge 105 is rotated thereabout to be available to the lather cutter 10. The lathe cutter 10 is then adjusted up and down until making contact with the contact face 60 of the gauge 105.

Figure 11:
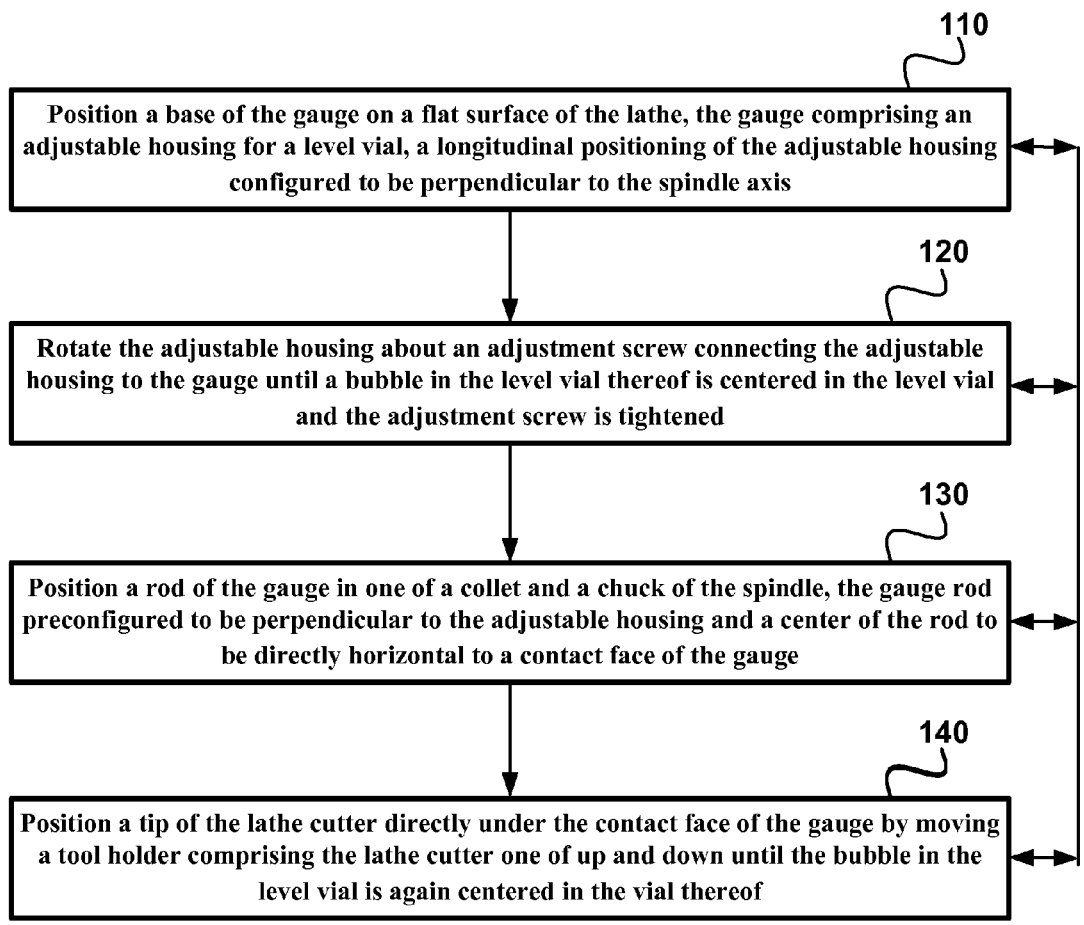
FIG. 11 is a block diagram of a method for setting a height of a lathe cutter to a same height of a spindle axis via a gauge comprising a rod receptacle in accordance with an embodiment of the present disclosure.

FIG. 11 is a block diagram of a method for setting a height of a lathe cutter to a same height of a spindle axis via a gauge comprising a rod receptacle in accordance with a disclosed embodiment. The method comprises positioning 110 a base of the gauge on a flat surface of the lathe, the gauge comprising an adjustable housing for a level vial, a longitudinal positioning of the adjustable housing configured to be perpendicular to the spindle axis. The method also includes rotating 120 the adjustable housing about an adjustment screw connecting the adjustable housing to the gauge until a bubble in the level vial thereof is centered in the level vial and the adjustment screw is tightened. The method additionally includes positioning 130 a rod of the gauge in one of a collet and a chuck of the spindle, the gauge rod preconfigured to be perpendicular to the adjustable housing and a center of the rod to be directly horizontal to a contact face of the gauge. The method further includes positioning 140 a tip of the lathe cutter directly under the contact face of the gauge by moving a tool holder comprising the lathe cutter one of up and down until the bubble in the level vial is again centered in the vial thereof.

Figure 12:
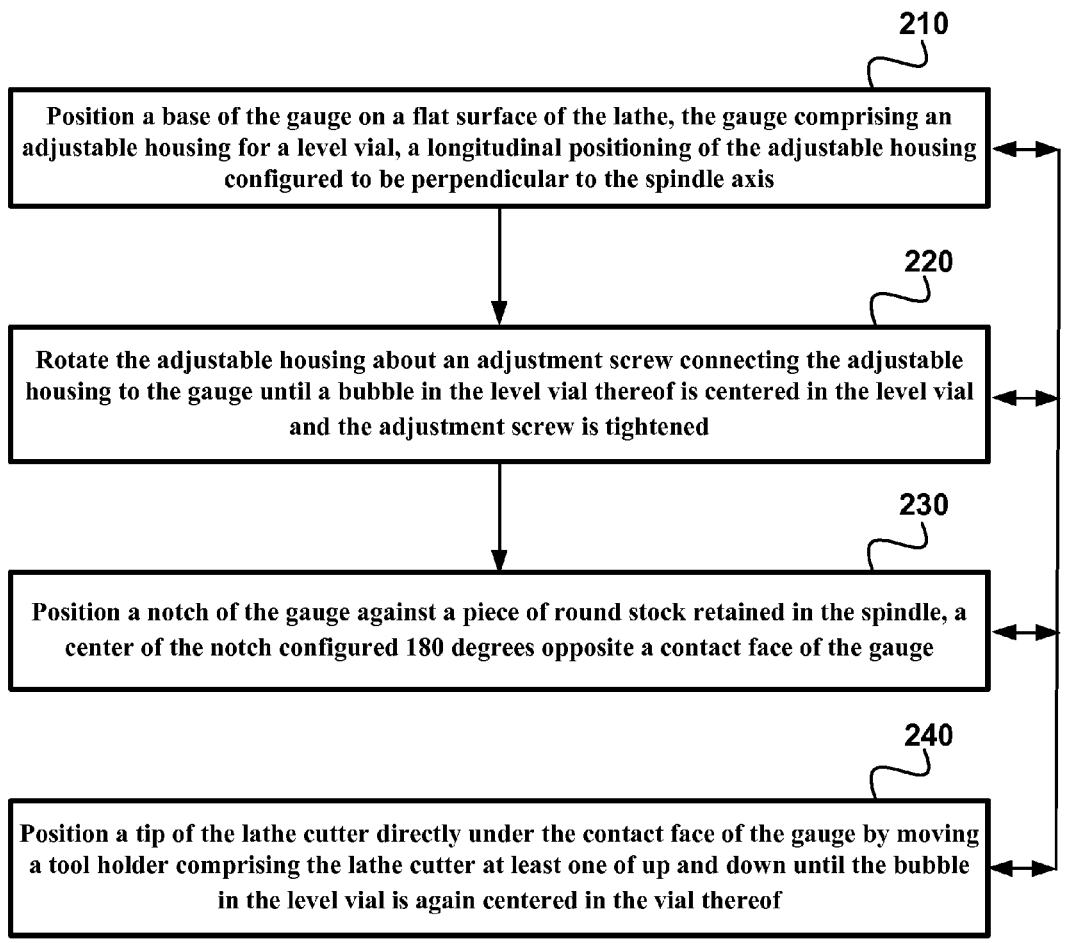
FIG. 12 is a block diagram of a method for setting a height of a lathe cutter to a same height of a spindle axis via a gauge comprising a chamfered notch in accordance with an embodiment of the present disclosure.

FIG. 12 is a block diagram of a method for setting a height of a lathe cutter to a same height of a spindle axis via a gauge comprising a chamfered notch in accordance with an embodiment of the present disclosure. The method comprises positioning 210 a base of the gauge on a flat surface of the lathe, the gauge comprising an adjustable housing for a level vial, a longitudinal positioning of the adjustable housing configured to be perpendicular to the spindle axis. The disclosed method also includes rotating 220 the adjustable housing about an adjustment screw connecting the adjustable housing to the gauge until a bubble in the level vial thereof is centered in the level vial and the adjustment screw is tightened. The disclosed method additionally includes positioning 230 a notch of the gauge against a piece of round stock retained in the spindle, a center of the notch configured 180 degrees opposite a contact face of the gauge. The disclosed method further includes positioning 240 a tip of the lathe cutter directly under the contact face of the gauge by moving a tool holder comprising the lathe cutter at least one of up and down until the bubble in the level vial is again centered in the vial thereof.

Figure 13:
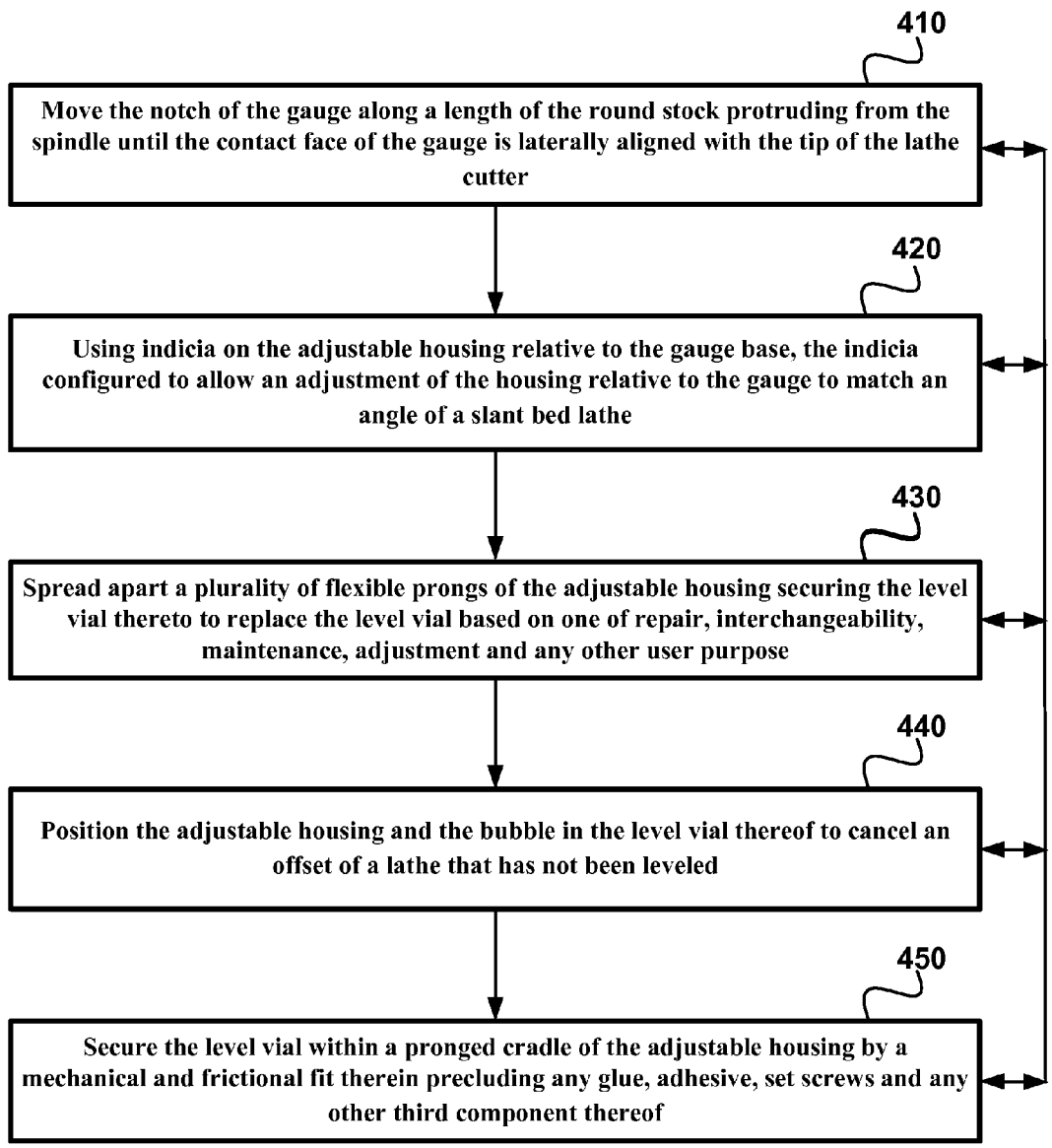
FIG. 13 is a block diagram of a method for operating a lathe cutter height gauge in accordance with an embodiment of the present disclosure.

FIG. 13 is a block diagram of a method for operating the lathe cutter height gauge in accordance with an embodiment of the present disclosure. An embodiment of the disclosed method further includes moving 410 the notch of the gauge along a length of the round stock protruding from the spindle until the contact face of the gauge is laterally aligned with the tip of the lathe cutter. Also, an embodiment of the method of operating the lathe cutter height gauge may include using 420 a marking and/or measuring indicia included on the adjustable housing relative to the gauge base, the indicia configured to allow an adjustment of the housing relative to the gauge to match an angle of a slant bed lathe. Therefore, an embodiment may further include spreading 430 apart three flexible prongs of the adjustable housing securing the level vial thereto to remove the level vial for one of repair, interchangeability, maintenance, adjustment and any other user purpose. The disclosed method may further include positioning 440 the adjustable housing and the bubble in the level vial thereof to cancel an offset of a lathe that has not been leveled. Another embodiment of the disclosed calibration method may include securing 450 the level vial within a pronged cradle of the adjustable housing by a mechanical and frictional fit therein precluding any glue, adhesive, set screws and any other third component thereof.

An embodiment of the disclosed calibration method includes marking indicia on the adjustable housing relative to the gauge configured for adding a calibration offset to a known angle set between the gauge and the adjustable housing of a slant bed lathe. A calibration granularity of a nominal 30½ millimeters is indicated on the level vial face, plus or minus ten percent. The indicia and/or markings may be engraved, embossed, printed and otherwise fixed onto the work piece positioning device in either the metric system of measurement or the English system of measurement. The indicia and/or markings may include numbers, letters and any other type of marking indicating length, width, difference and other measurements indicative of the clearance between the vise stop device and the work piece via the stop pin.

Figure 14:
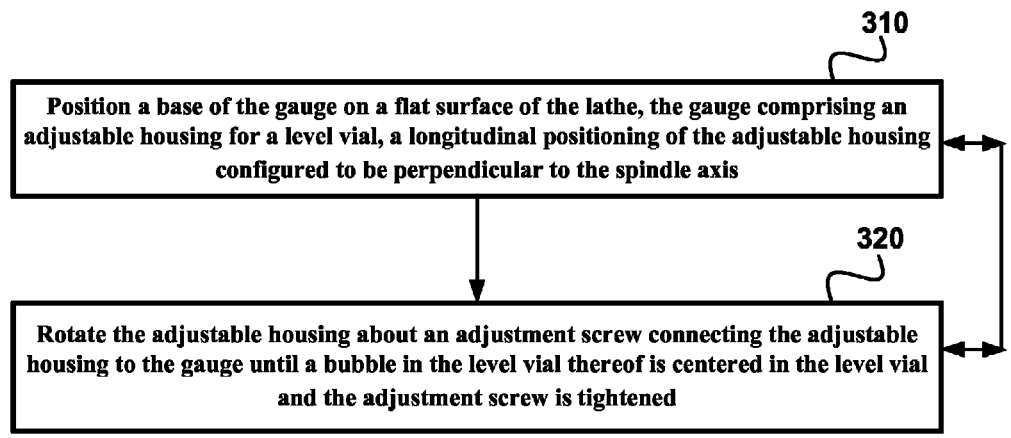
FIG. 14 is a block diagram of a method for calibrating a lathe cutter height gauge in accordance with an embodiment of the present disclosure.

FIG. 14 is a block diagram of a method for calibrating a lathe cutter height gauge in accordance with an embodiment of the present disclosure. The method includes positioning 310 a base of the gauge on a flat surface of the lathe, the gauge comprising an adjustable housing for a level vial, a longitudinal positioning of the adjustable housing configured to be perpendicular to the spindle axis. The method also includes rotating 320 the adjustable housing about an adjustment screw connecting the adjustable housing to the gauge until a bubble in the level vial thereof is centered in the level vial and the adjustment screw is tightened.

Also, the lather cutter may be replaced by a boring bar positioned for making a circular and radial plunge cut into a round stock placed in the spindle. Therefore, all preceding methods and structure regarding a lathe cutter height gauge are applicable to a boring bar in place of a lathe cutter. The present disclosure may also include a boring bar height gauge and methods of use and operation.

Figure 15:
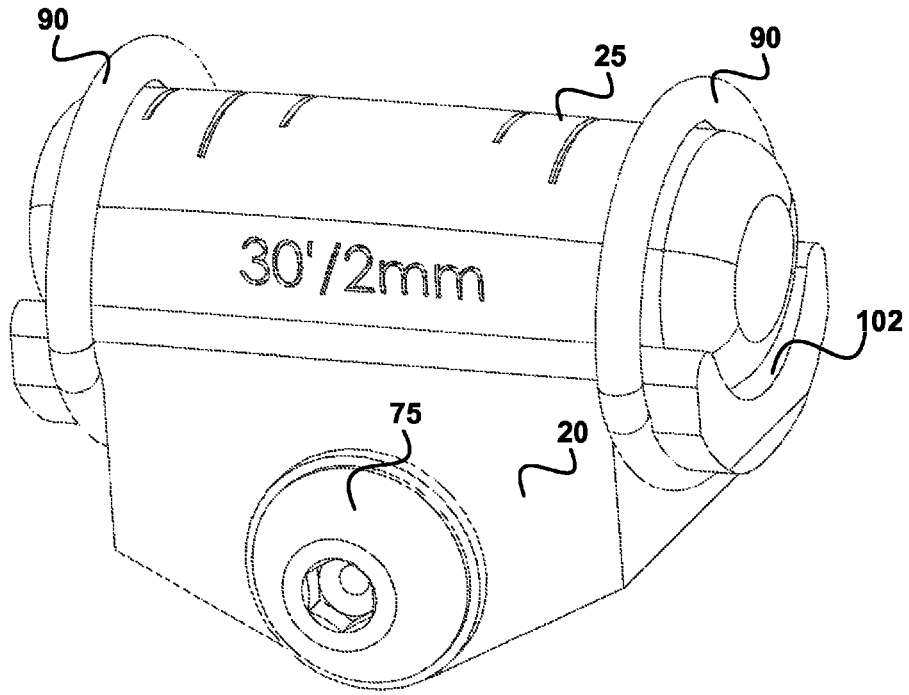
FIG. 15 is a perspective view of an adjustable housing and a level vial secured in a cradle thereof with rubber bands in accordance with an embodiment of the present disclosure.

FIG. 15 is a perspective view of an adjustable housing and a level vial secured in a cradle thereof with rubber bands in accordance with an embodiment of the present disclosure. The adjustable housing is configured to secure the level vial within a pronged cradle by a mechanical and frictional fit therein precluding any glue and adhesive. Rubber bands 90 may also be configured to secure the level vial 25 in a determinable position relative to the adjustable housing 20 by a frictional fit. The rubber bands 90 may therefore circumferentially fit around the level via 25 and a cradle 102 configured to retain the level via 25. The rubber band cradle 102 provides a ledge for a respective rubber band to stretch radially around the level vial 25 and secure the level via 25 in a determinable position relative to the adjustable housing 20 by an elastic pressure fit. The boss screw 75 secures the adjustable housing 20 to the gauge 5 or 105.

Figure 16:
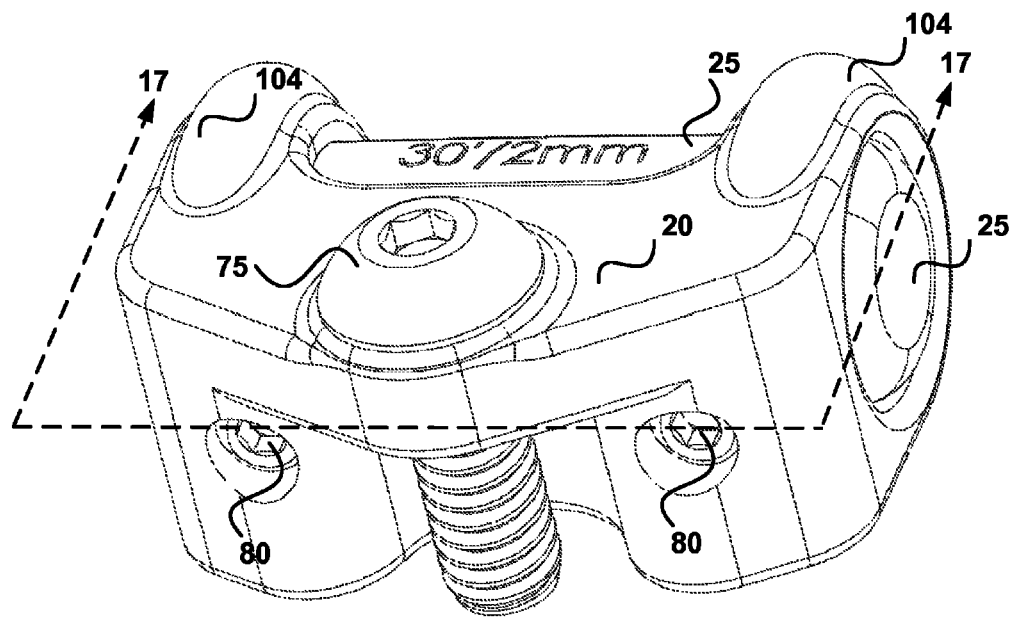
FIG. 16 is a perspective view of an adjustable housing and a level vial secured in a cradle thereof with arms and set therein relative to the adjustable housing via set screws in accordance with an embodiment of the disclosure.

FIG. 16 is a perspective view of an adjustable housing and a level vial secured in a cradle thereof with arms and set therein relative to the adjustable housing via set screws in accordance with an embodiment of the disclosure. The adjustable housing 20 may further comprise set screws 80 configured to extend from an outside of the adjustable housing 20 through the housing 20 onto the level vial 25, the set screws 80 configured to secure the level vial 25 in a determinable position relative to the adjustable housing 20 by a mechanical fit. The boss screw 75 secures the adjustable housing 20 to the gauge 5 or 105. The adjustable housing arms 104 circumferentially extend around the level vial 25 to provide a counter force to a set screw force securing the level vial 25 within the adjustable housing 20 in a determinable position relative thereto by an elastic pressure fit.

Figure 17:
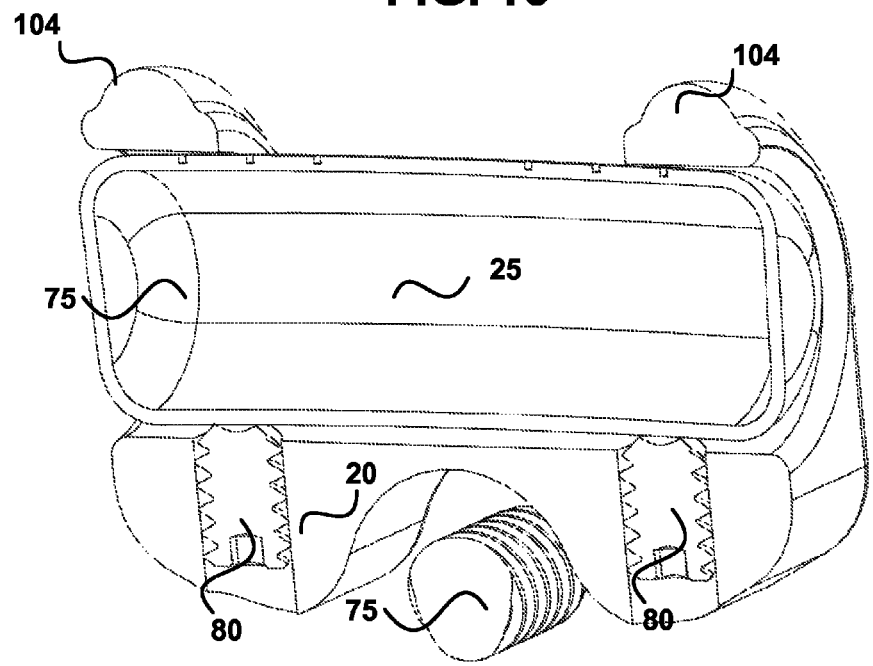
FIG. 17 is a cross-sectional view of a second half of FIG. 16 taken through the section 17 illustrating the mechanical fit between the set screws in the adjustable housing and the level vial in accordance with an embodiment of the present disclosure.

FIG. 17 is a cross-sectional view of a second half of FIG. 16 taken through the section 17 illustrating the mechanical fit between the set screws in the adjustable housing and the level vial in accordance with an embodiment of the present disclosure. The set screws 80 are clearly shown making contact against the level vial 25. The level vial 25 is also clearly seen making contact against an opposing side of the adjustable housing arms 104. Other reference numbers are the same or similar to reference numbers in FIG. 16 from which FIG. 17 is a cross-sectional view. Helical threads (not shown) in the adjustable housing 20 provide for the set screws 80 to be adjusted at varying degrees against the level vial 25.

Figure 18:
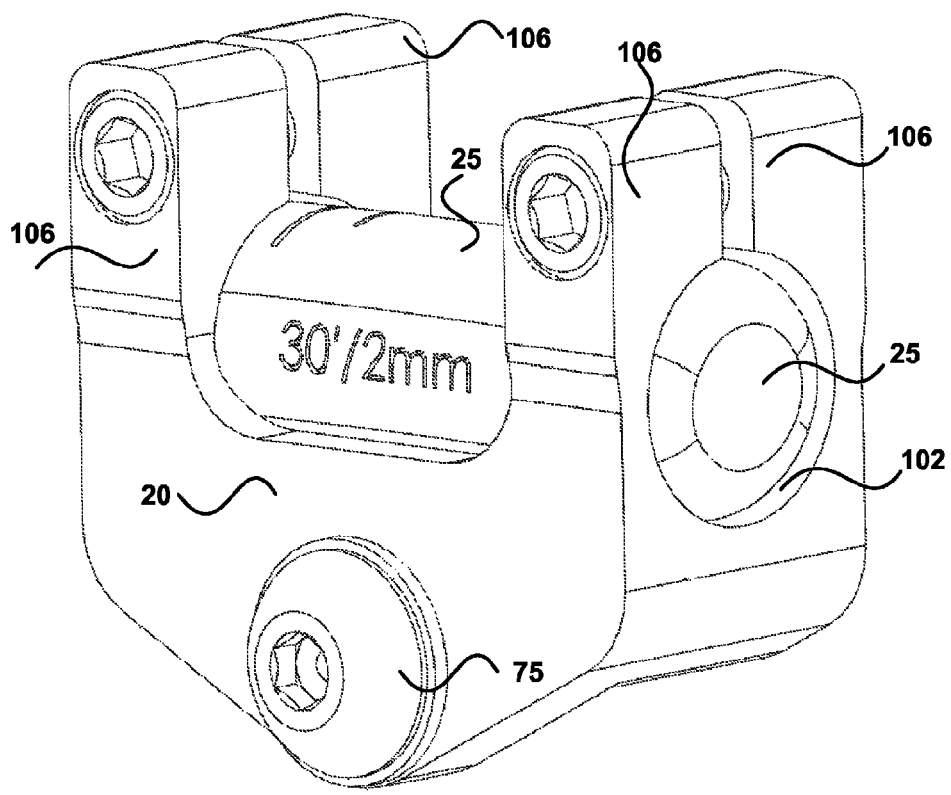
FIG. 18 is a perspective view of an adjustable housing and a level via secured in a cradle thereof with clamping arms in accordance with an embodiment of the present disclosure.

FIG. 18 is a perspective view of an adjustable housing and a level via secured in a cradle thereof with clamping arms in accordance with an embodiment of the present disclosure. An embodiment of the disclosure may include the adjustable housing configured with a clamp or clamping arms 106. The clamping arms 106 are configured to secure the level vial 25 in a determinable position relative to the adjustable housing 20 by at least one of a mechanical fit and a frictional fit. The clamp cradle 102 provides a seat for a circumferential level vial 25. The clamping arms 106 may be kept in proximity to each other via clamping screws extending from one clamping arm to another. The clamping arms 106 secure the level via 25 in a determinable position relative to the adjustable housing 20 by a mechanical pressure fit. Other reference numbers and features depicted may be same or similar to other figures within the present disclosure.

Figure 19:
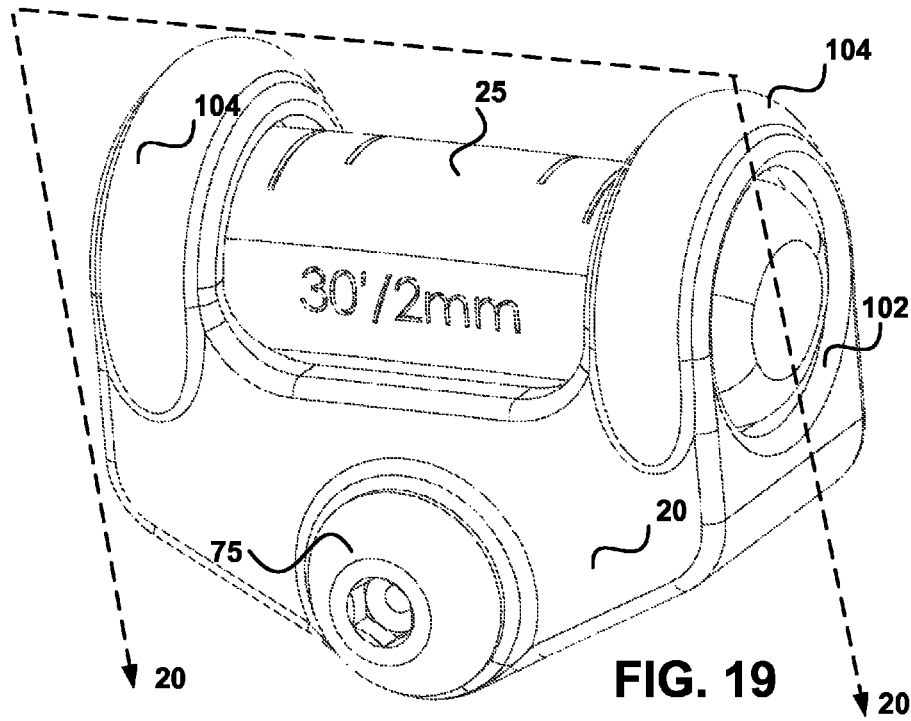
FIG. 19 is a perspective view of an adjustable housing and a level via secured in a cradle thereof with o-ring arms in accordance with an embodiment of the present disclosure.

FIG. 19 is a perspective view of an adjustable housing and a level via secured in a cradle thereof with o-ring arms in accordance with an embodiment of the present disclosure. The adjustable housing 20 may be configured with an o-ring 108 (depicted in FIG. 20) set in a channel in circumferential arms 104. The circumferential arms 104 secure the level via 25 in a determinable position relative to the adjustable housing 20 via the o-rings and a mechanical pressure fit. Other reference numbers and features depicted may be same or similar to other figures within the present disclosure.

Figure 20:
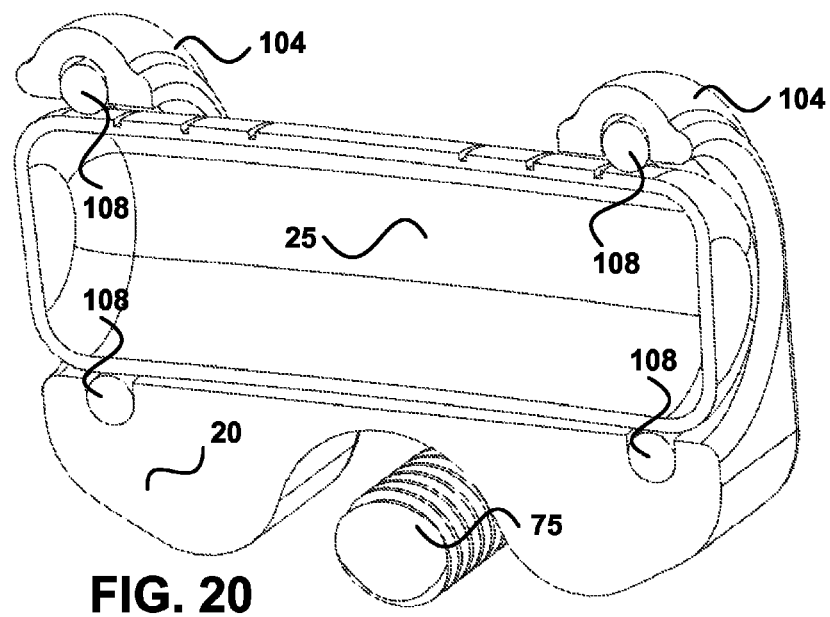
FIG. 20 is a cross-sectional view of a second half of FIG. 19 taken through the section 19 illustrating the o-ring and channel in the arms of the adjustable housing in accordance with an embodiment of the present disclosure.

FIG. 20 is a cross-sectional view of a second half of FIG. 19 taken through the section 19 illustrating the o-ring and channel in the arms of the adjustable housing in accordance with an embodiment of the present disclosure. The adjustable housing 20 comprises a channel in the circumferential arms 104 for the o-rings 108. The circumferential arms 104 secure the level via 25 in a determinable position relative to the adjustable housing 20 via the o-rings and a mechanical pressure fit. Other reference numbers and features depicted may be same or similar to other figures within the present disclosure. A single or multiple circumferential arms may extend from the adjustable housing 20 in order to secure the level vial 25 thereto.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

While the forgoing examples are illustrative of the principles of the present disclosure in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the disclosure be limited, except as by the specification and claims set forth herein.

What is claimed is:

1. A gauge configured to set a lathe cutter on a plane parallel to a lathe bed intersecting a spindle axis, the gauge comprising:
   a pivotably adjustable housing configured to secure a level vial therein, a pivotable positioning of the level vial configured to be perpendicular to the spindle axis, the adjustable housing pivotably connected to the gauge to enable a bubble in the level vial to be longitudinally centered therein and the adjustable housing to be pivotably placed relative to the gauge; and a tip of a contact face configured to be 180 degrees opposite a center of a notch in the gauge, the tip of the contact face adapted to provide a point of contact for the lathe cutter based on the center of the notch and the contact face being level with a center of the spindle axis.

2. The gauge of claim 1, further comprising a chamfered notch in the gauge configured to circumferentially mate with and to be slidable along a circumference of a workpiece shaft positioned in one of a collet and a chuck of the spindle thereof and also to be rotatable about an axis thereof to determine a spindle height adjustment.

3. The gauge of claim 2, wherein the notch of the gauge is configured to accommodate any round stock shaft up to 4 inches in diameter.

4. The gauge of claim 1, wherein the adjustable housing further comprises a plurality of flexible prongs extending therefrom, the prongs configured to secure the level vial in a determinable position relative to the adjustable housing by at least one of a mechanical fit and a frictional fit.

5. The gauge of claim 4, wherein the plurality of flexible prongs are configured to enable interchanging the level vial with any other level vial of similar dimensions by a digital action excluding moving the adjustable housing and loosening an adjustment screw thereof and precluding any glue, adhesive, set screws and any third component thereof.

6. The gauge of claim 1, further comprising the adjustable housing configured to secure the level vial within a pronged cradle by a mechanical and frictional fit therein precluding any glue, adhesive, set screws and any other third component thereof.

7. The gauge of claim 1, wherein the adjustable housing further comprising at least one circumferential arm for retaining the level vial therein and at least one set screw configured to extend from an outside of the adjustable housing through the housing onto the level vial, the set screw configured to secure the level vial in a determinable position relative to the adjustable housing by a mechanical fit.

8. The gauge of claim 1, wherein the adjustable housing further comprises one of a clamp and clamping arms extending from the adjustable housing, the clamp and clamping arms configured to secure the level vial in a determinable position relative to the adjustable housing by at least one of a mechanical fit and a frictional fit.

9. The gauge of claim 1, wherein the adjustable housing further comprises at least one rubber band cradle and ledge and a plurality of rubber bands configured to secure the level vial in the rubber band cradle in a determinable position relative to the adjustable housing by a frictional fit.

10. The gauge of claim 1, wherein the adjustable housing further comprises circumferential arms and at least one o-ring disposed in a channel therein, the circumferential arms configured to extend around a circumference of the level vial and the at least one o-ring configured to secure the level vial in a determinable position relative to the adjustable housing by a mechanical fit.

11. The gauge of claim 1, further comprising marking indicia on the adjustable housing relative to the gauge base, the indicia configured to add a calibration offset to a known angle set between the gauge base and the adjustable housing for a slant bed lathe application.

12. A gauge configured to set a lathe cutter on a plane parallel to a lathe bed intersecting a spindle axis, the gauge comprising:

a pivotably adjustable housing configured to secure a level vial therein, a pivotable longitudinal positioning of the level vial configured to be perpendicular to the spindle axis, the adjustable housing pivotably moveably connected to the gauge to enable a bubble in the level vial to be longitudinally centered therein and the adjustable housing to be pivotably placed relative to the gauge;

at least one circumferential arm configured to retain the level vial therein and at least one set screw configured to extend from an outside of the adjustable housing through the housing onto the level vial, the set screw configured to secure the level vial in a determinable position relative to the adjustable housing by a mechanical fit; and a tip of a contact face configured to be 180 degrees opposite a center of a notch in the gauge, the tip of the contact face adapted to provide a point of contact for the lathe cutter based on the center of the notch and the contact face being level with a center of the spindle axis.

13. The gauge of claim 12, wherein the level vial and the adjustable housing are configured relative to each other to enable positioning the adjustable housing and the bubble in the level vial thereof to cancel an offset of a lathe that has not been leveled.

14. A gauge configured to set a lathe cutter on a plane parallel to a lathe bed intersecting a spindle axis, the gauge comprising:

a pivotably adjustable housing configured to secure a level vial therein, a pivotable positioning of the level vial configured to be perpendicular to the spindle axis, the adjustable housing pivotably connected to the gauge to enable a bubble in the level vial to be longitudinally centered therein and the adjustable housing to be pivotably placed relative to the gauge;

one of a clamp and clamping arms extending from the adjustable housing, the clamp and clamping arms configured to secure the level vial in a determinable position relative to the adjustable housing by at least one of a mechanical fit and a frictional fit; and a tip of a contact face configured to be 180 degrees opposite a center of a notch in the gauge, the tip of the contact face adapted to provide a point of contact for the lathe cutter based on the center of the notch and the contact face being level with a center of the spindle axis.

15. The gauge of claim 14, further comprising a notch in the gauge configured to slide along a length of a round stock protruding from the spindle until a tip of the contact face of the gauge is level with the tip of the lathe cutter.

16. A gauge configured to set a lathe cutter on a plane parallel to a lathe bed intersecting a spindle axis, the gauge comprising:

a pivotably adjustable housing configured to secure a level vial therein, a pivotable positioning of the level vial configured to be perpendicular to the spindle axis, the adjustable housing pivotably connected to the gauge to enable a bubble in the level vial to be longitudinally centered therein and the adjustable housing to be pivotably placed relative to the gauge;

at least one rubber band cradle and ledge and a plurality of rubber bands configured to secure the level vial in the rubber band cradle a determinable position relative to the adjustable housing by a frictional fit; and a tip of a contact face configured to be 180 degrees opposite a center of a notch in the gauge, the tip of the contact face adapted to provide a point of contact for the lathe cutter based on the center of the notch and the contact face being level with a center of the spindle axis.

17. A gauge configured to set a lathe cutter on a plane parallel to a lathe bed intersecting a spindle axis, the gauge comprising:
- a pivotably adjustable housing configured to secure a level vial therein, a pivotable positioning of the level vial configured to be perpendicular to the spindle axis, the adjustable housing pivotably connected to the gauge to enable a bubble in the level vial to be longitudinally centered therein and the adjustable housing to be pivotably placed relative to the gauge;
- at least one circumferential arm and at least one o-ring disposed in a channel thereof, the circumferential arms configured to extend around a circumference of the level vial and the at least one o-ring configured to secure the level vial in a determinable position relative to the adjustable housing by one of a mechanical and frictional fit; and
- a tip of a contact face configured to be 180 degrees opposite a center of a notch in the gauge, the tip of the contact face adapted to provide a point of contact for the lathe cutter based on the center of the notch and the contact face being level with a center of the spindle axis.

18. A gauge configured to set a height of a lathe cutter to a same height of a spindle axis via the gauge, the gauge comprising:
- a pivotably adjustable housing moveably connected to the gauge, the adjustable housing comprising a level vial, a pivotable positioning of the level vial configured to be perpendicular to the spindle axis and the adjustable housing to be pivotably placed relative to the gauge;
- a receptacle defined through the gauge body for orthogonally receiving a shaft positioned in one of a collet and a chuck of the spindle, the receptacle defined to receive the shaft perpendicular to the level vial and a center of the shaft in the receptacle to be 180 degrees opposite a contact face of the gauge; and
- a tip of a contact face configured to be 180 degrees opposite a center of a notch in the gauge, the tip of the contact face adapted to provide a point of contact for a lathe cutter based on the center of the notch and the contact face being level with a center of the spindle axis.

19. The gauge of claim 18, for setting a height of a lathe cutter to a same height of a spindle axis via the gauge, wherein the receptacle is configured to be slidable along a circumference of the shaft and also to be rotatable about an axis thereof.

20. The gauge of claim 18 for setting a height of a lathe cutter to a same height of a spindle axis via the gauge, wherein an inner diameter of the gauge receptacle measures a nominal one quarter inch in diameter.

21. The gauge of claim 18 for setting a height of a lathe cutter to a same height of a spindle axis via the gauge, wherein the gauge receptacle is configured to enable laterally adjusting the gauge on a circumference of the shaft protruding from the spindle until a tip of the contact face of the gauge is level with the tip of the lathe cutter.

22. The gauge of claim 18 for setting a height of a lathe cutter to a same height of a spindle axis via the gauge, further comprising replacing the lathe cutter by a boring bar positioned for making a circular and radial plunge cut into a round stock placed in the spindle.

\* \* \* \* \*